(12) United States Patent
Imao et al.

(10) Patent No.: US 7,716,020 B2
(45) Date of Patent: May 11, 2010

(54) RECORDING MEDIUM STORING CAR SEAT FABRIC SIMULATION PROGRAM, CAR SEAT FABRIC SIMULATION METHOD, CAR SEAT FABRIC SIMULATION DEVICE, CAR SEAT FABRIC MANUFACTURING METHOD, AND CAR SEAT FABRIC TRADING METHOD

(75) Inventors: Koji Imao, Osaka (JP); Shintaro Takemura, Osaka (JP); Yoshiyuki Sakaguchi, Osaka (JP); Takayuki Higashiuchi, Nagoya (JP); Takayuki Arai, Nagoya (JP); Yasuharu Kase, Nagoya (JP); Kiyoshi Kawarazaki, Anjo (JP)

(73) Assignees: Digital Fashion Ltd. (JP); Toyota Tsusho Corporation (JP)

( * ) Notice: Subject to any disclaimer, the term of this patent is extended or adjusted under 35 U.S.C. 154(b) by 498 days.

(21) Appl. No.: 11/661,175

(22) PCT Filed: Aug. 24, 2005

(86) PCT No.: PCT/JP2005/015357

§ 371 (c)(1),
(2), (4) Date: Feb. 26, 2007

(87) PCT Pub. No.: WO2006/022299

PCT Pub. Date: Mar. 2, 2006

(65) Prior Publication Data
US 2009/0119112 A1 May 7, 2009

(30) Foreign Application Priority Data
Aug. 26, 2004 (JP) ............... 2004-247099

(51) Int. Cl.
*G06F 17/50* (2006.01)

(52) U.S. Cl. ........................... 703/1; 700/98

(58) Field of Classification Search ............... 703/1, 703/2, 6, 8; 700/98, 130; 705/1, 26, 27
See application file for complete search history.

(56) References Cited

U.S. PATENT DOCUMENTS

2001/0026272 A1* 10/2001 Feld et al. ............... 345/419

(Continued)

FOREIGN PATENT DOCUMENTS

EP          1306474          5/2003

(Continued)

OTHER PUBLICATIONS

Lomov S V et al. "Textile composites: modelling strategies", vol. 32, No. 10, Oct. 1, 2001, pp. 1379-1394.

(Continued)

*Primary Examiner*—Russell Frejd
(74) *Attorney, Agent, or Firm*—Gerald E. Hespos; Michael J. Porco

(57) ABSTRACT

A car seat fabric is simulated with a feeling of reality. A fabric texture information input acceptance portion (101) accepts texture information about the fabric used for the car seat fabric. A thread information input acceptance portion (102) accepts thread information about threads used for the fabric. A 3-D fabric image creation portion (103) creates a steric structure of the car seat fabric as a 3-D fabric image on the basis of the texture information accepted at the fabric texture information input acceptance portion (101) and the thread information accepted at the thread information input acceptance portion (102). An image attachment portion (105) attaches the 3-D fabric image created by the 3-D fabric image creation portion (103) to a car seat model. A car seat image display (402) displays the car seat model to which the 3-D fabric image is attached by the image attachment portion (105).

8 Claims, 9 Drawing Sheets

U.S. PATENT DOCUMENTS

2005/0037682 A1 2/2005 Taylor et al.
2006/0132496 A1* 6/2006 Horton et al. .............. 345/582

FOREIGN PATENT DOCUMENTS

| JP | 6-248536 | 9/1994 |
|---|---|---|
| JP | 7-216682 | 8/1995 |
| JP | 2000-259687 | 9/2000 |
| JP | 2002-155446 | 5/2002 |
| JP | 2003-067443 | 3/2003 |
| JP | 2003-187128 | 7/2003 |

OTHER PUBLICATIONS

Kawabata S; Niwa M; Kawai H: "The Finite-Deformation Theory of Plain-Weave Fabrics Part I: The Biaxial-Deformation Theory" Journal of the Textile Institute, 1754-2340, vol. 64, No. 1, 1973, pp. 21-46.

Boisse P et al: Analyses of fabric tensile behaviour: determination of the biaxial tension-strain surfaces and their use in forming simulations vol. 32, No. 10, Oct. 1, 2001, pp. 1395-1414.

* cited by examiner

RECORDING MEDIUM STORING CAR SEAT FABRIC SIMULATION PROGRAM, CAR SEAT FABRIC SIMULATION METHOD, CAR SEAT FABRIC SIMULATION DEVICE, CAR SEAT FABRIC MANUFACTURING METHOD, AND CAR SEAT FABRIC TRADING METHOD

BACKGROUND OF THE INVENTION

1. Field of the Invention

The present invention relates to a recording medium storing a car seat fabric simulation program, a car seat fabric simulation method, and a car seat fabric simulation device to simulate a 3-D woven structure of a car seat fabric, and to a car seat fabric manufacturing method for manufacturing a car seat fabric as well as a car seat fabric trading method for trading a car seat fabric.

2. Description of the Related Art

In the step of designing and producing a car seat fabric in the related art, the textile manufacturer first produces trial products of the fabric that meet the need of the automobile manufacturer. The automobile manufacturer picks up one of the trial products that is closest to the image they have in mind, and provides instructions for further improvements. The textile manufacturer makes improvements on the trial product, and decides a final fabric by exchanging the feedback repetitively with the automobile manufacturer.

As has been described, the automobile manufacturer and the textile manufacturer have to exchange the feedback several times until the car seat fabric is determined. In particular, the textile manufacturer actually has to produce plural trial products of the fabric.

As a device that creates a surface design pattern of the fabric, the technique disclosed in Patent Document 1 has been known. The surface design pattern creating device described in Patent Document 1 creates a cloth design image from data about the fabric. Patent Document 1: JP-A-6-248536.

SUMMARY OF THE INVENTION

As has been described above, the textile manufacturer produces the trial product of the car seat fabric. The trial product, however, does not necessarily match the exact image because of a difference when one sees the trial product actually applied to a car seat and when one sees it merely in the form of a cloth.

In addition, the surface design pattern creating device of Patent Document 1 is configured to create a 2-D cloth design image. There may be a method by which a car seat model comprising plural polygons is created on a 3-D space while a 2-D image of the car seat fabric is created by the surface design pattern creating device described above, so that the texture map of the car seat fabric is applied to the car seat model. However, because a fabric is a cloth woven using threads of the warp and threads of the weft, and in particular, strong and thick threads are used as the threads of the warp and the threads of the weft for the car seat fabric, characteristic irregularities appear on the surface. It is difficult to express such irregularities on the surface of the car seat with a 2-D image, and it becomes particularly difficult with a fabric in which the threads of the warp and the threads of the weft have an effect on each other.

The invention was devised to solve the problems discussed above, and therefore has an object to provide a recording medium storing a car seat fabric simulation program, a car seat fabric simulation method, a car seat fabric simulation device, a car seat fabric manufacturing method, and a car seat fabric trading method, with all which a car seat fabric can be simulated with a feeling of reality.

A recording medium storing a car seat fabric simulation program of the invention is a recording medium storing a car seat fabric simulation program to simulate a 3-D woven structure of a car seat fabric, causing a computer to function as: texture information input acceptance means for accepting an input of texture information about a fabric texture used for the car seat fabric; thread information input acceptance means for accepting an input of thread information about threads used for the car seat fabric; 3-D fabric image creation means for creating a steric structure of the car seat fabric within a 3-D space as a 3-D fabric image on the basis of the texture information accepted at the texture information input acceptance means and the thread information accepted at the thread information input acceptance means; image attachment means for attaching the 3-D fabric image created by the 3-D fabric image creation means to a car seat model; and display means for displaying thereon the car seat model to which the 3-D fabric image is attached by the image attachment means.

According to this configuration, an input of the texture information about the fabric texture used for the car seat fabric is accepted, and an input of the thread information about the threads used for the car seat fabric is accepted. The steric structure of the car seat fabric within a 3-D space is created as a 3-D fabric image on the basis of the accepted texture information and the accepted thread information. The 3-D fabric image thus created is attached to a car seat model, and the car seat model attached with the 3-D fabric image is displayed.

It is thus possible to simulate the car seat fabric with a feeling of reality, and the need to produce actual trial products of the car seat fabric is eliminated by virtually displaying the car seat using the car seat fabric. The cost needed to actually manufacture the trial products can be therefore reduced.

According to the recording medium storing the car seat fabric simulation program of the invention, a car seat fabric can be simulated with a feeling of reality, and the need to produce actual trial products of the car seat fabric can be eliminated by virtually displaying the car seat using the car seat fabric. It is thus possible to reduce the cost needed to actually manufacture the trial products.

The above and other objects, features, aspects, and advantages of the invention will become more apparent from the following detailed description with reference to the accompanying drawings.

DETAILED DESCRIPTION OF THE PREFERRED EMBODIMENTS

Figure 1:
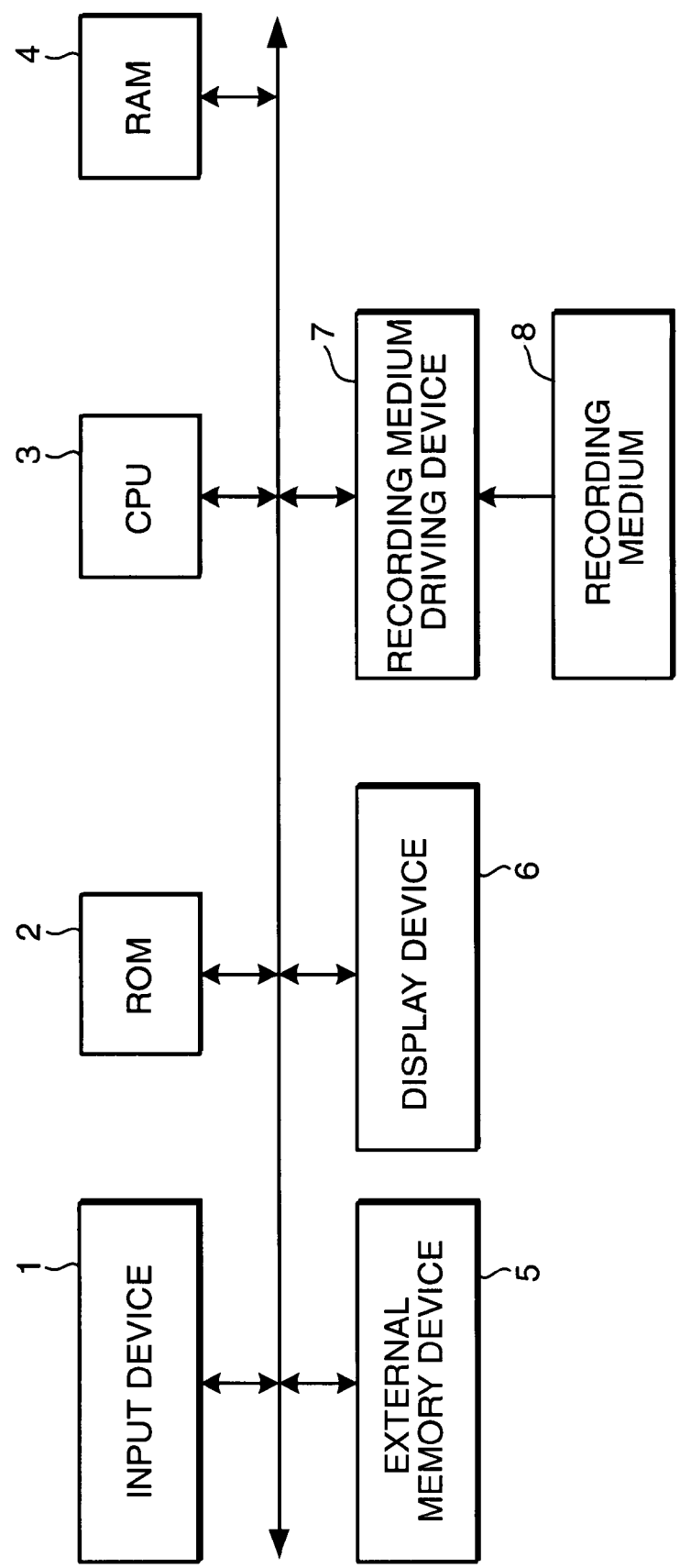
FIG. 1 is a view showing the hardware configuration of a car seat fabric simulation device according to one embodiment of the invention.

Hereinafter, one embodiment of the invention will be described with reference to the drawings. FIG. 1 is a view showing the hardware configuration of a car seat fabric simulation device according to one embodiment of the invention. The car seat fabric referred to herein means a fabric used for the seats installed in a vehicle.

The car seat fabric simulation device shown in FIG. 1 comprises a typical computer, and includes an input device 1, a ROM (Read Only Memory) 2, a CPU (Central Processing Unit) 3, a RAM (Random Access Memory) 4, an external memory device 5, a display device 6, and a recording medium driving device 7. Each block is connected to an internal bus, and various kinds of data are inputted into and outputted from each block via this bus for various kinds of processing to be performed under the control of the CPU 3.

The input device 1 comprises a keyboard, a mouse, or the like, and is used for the operator to input various kinds of data, operation instructions, and so forth.

The ROM 2 has pre-stored a system program, such as BIOS (Basic Input/Output System). The external memory device 5 comprises a hard disc drive or the like, and has pre-stored the specific OS (Operating System), a car seat fabric simulation program described below, and so forth. The RAM 4 is used as a work area or the like of the CPU 3.

The display device 6 comprises a liquid crystal display, a CRT (Cathode-Ray Tube), or the like, and under the control of the CPU 3, it displays a virtual car seat fabric and a car seat virtually attached with the car seat fabric both created by executing the car seat fabric simulation program.

The recording medium driving device 7 comprises a DVD-ROM drive, a CD-ROM drive, a flexible disc drive, or the like. The car seat fabric simulation program may be recorded in a computer-readable recording medium 8, such as a DVD-ROM, a CD-ROM, and a flexible disc, so that the car seat fabric simulation program is executed by being read out from the recording medium 8 using the recording medium driving device 7 and installed in the external memory device 5. Alternatively, the car seat fabric simulation device may be provided with a communication device or the like, so that in a case where the car seat fabric simulation program is stored in another computer connected via a communication network, the car seat fabric simulation program can be executed by being downloaded from this computer via the network.

Figure 2:
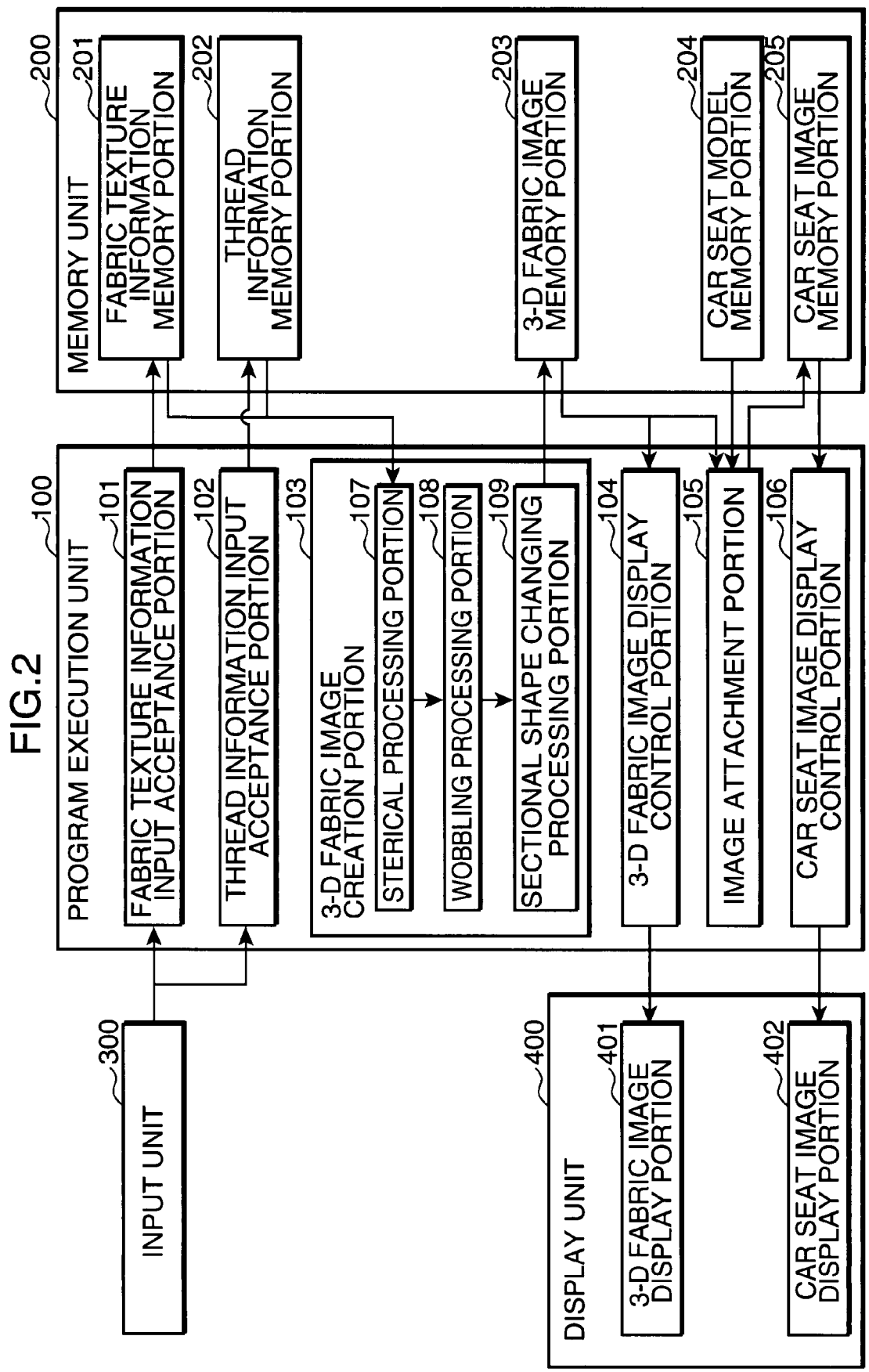
FIG. 2 is a block diagram used to describe the function of the car seat fabric simulation device of the invention.

FIG. 2 is a block diagram used to describe the function of the car seat fabric simulation device of the invention. As is shown in FIG. 2, the car seat fabric simulation device comprises a program execution unit 100, a memory unit 200, an input unit 300, and a display unit 400. The program execution unit 100 is achieved as the CPU 3 executes the car seat fabric simulation program, and it includes a fabric texture information input acceptance portion 101, a thread information input acceptance portion 102, a 3-D fabric image creation portion 103, a 3-D fabric image display control portion 104, an image attachment portion 105, and a car seat image display control portion 106. The memory unit 200 comprises a RAM 4 or the like, and is achieved as the CPU 3 executes the car seat fabric simulation program. It includes a fabric texture information memory portion 201, a thread information memory portion 202, a 3-D fabric image memory portion 203, a car seat model memory portion 204, and a car seat image memory portion 205. The display unit 400 comprises the display device 6 or the like, and includes a 3-D fabric image display portion 401 and a car seat image display portion 402.

The input unit 300 comprises the input device 1 or the like, into which are inputted fabric texture information about the fabric texture used for the car seat fabric and thread information about the kind, the thickness, and so forth of the threads used for the car seat fabric. For example, the user operates the display unit 400 to display thereon a fabric texture information input screen, and inputs the fabric texture used for the car seat fabric. Also, the user operates the display unit 400 to display thereon a thread information input screen, and inputs the kind, the thickness, and so forth of the threads used for the car seat fabric.

The fabric texture information input acceptance portion 101 accepts an input of fabric texture information about the fabric texture used for the car seat fabric. The fabric texture information specifies fabric manufacturing conditions, such as the interlace state of the threads of the warp and the threads of the weft of the car seat fabric, the density of the fabric texture, and the magnitude of tensile forces acting on the threads of the warp and the threads of the weft. The thread information input acceptance portion 102 accepts an input of thread information about the kind, the thickness, and so forth of the threads used for the car seat fabric.

The fabric texture information memory portion 201 stores the fabric texture information accepted at the fabric texture information input acceptance portion 101. The thread information memory portion 202 stores the thread information accepted at the thread information input acceptance portion 102.

The 3-D fabric image creation portion 103 creates a 3-D fabric image on a 3-D space on the basis of the fabric texture information accepted at the fabric texture information input acceptance portion 101 and the thread information accepted at the thread information input acceptance portion 102. It comprises a sterical processing portion 107, a wobbling processing portion 108, and a sectional shape changing processing portion 109.

The sterical processing portion 107 transforms the woven structure into a steric form on the basis of the fabric texture information. More specifically, the sterical processing portion 107 transforms the woven structure into a steric form by simulating tensile forces of the threads of the warp and the threads of the weft forming the car seat fabric from the nature of the respective threads to shrink by the initial tensile force of the threads and the equilibrium of force at the contact point of a thread the warp and a thread of the weft included in the fabric manufacturing conditions in the fabric texture information, and finding the position coordinates of the center points of the threads of the warp and the threads of the weft within the 3-D space at the intersections at which the threads of the warp and the threads of the weft cross each other. The sterical processing portion 107 moves a thread in a vertical direction significantly in comparison with the thickness of the thread by moving the thread in such a manner so as to minimize a difference in height of the thread that varies from one position to another.

The wobbling processing portion 108 wobbles the woven structure at the intersections at which the threads of the warp and the threads of the weft cross each other. In other words, the wobbling processing portion 108 wobbles the woven structure by linking the center points of the threads of the warp and the threads of the weft at the respective intersections found by the sterical processing portion 107. The center points of the threads of the warp and the threads of the weft at the respective intersections become continuous by a smooth curve, for example, a sine curve or a spline curve. In a case where the threads of one of the warp and the weft pass over or under the threads of the other, the wobbling processing portion 108 compares an inclination of a first thread one of the warp and the weft before the passing and an inclination of the first thread after the passing, and calculates a force acting on a second thread of the other from the side having the larger inclination to the side having the smaller inclination to move the position of the second thread according to the magnitude of the force thus calculated.

The sectional shape changing processing portion 109 changes the thickness on the basis of a force exerted from a first thread of one of the warp and the weft on a second thread of the other at the intersections at which the threads of the warp and the threads of the weft cross each other. More specifically, the sectional shape changing processing portion 109 changes the thicknesses of the threads of the warp and the threads of the weft by changing the sectional shape of the threads of the warp wobbled by the wobbling processing portion 108 according to the magnitude of a force exerted from the threads of the weft, and by changing the sectional shape of the threads of the weft wobbled by the wobbling processing portion 108 according to the magnitude of a force exerted from the threads of the warp.

The 3-D fabric image memory portion 203 stores a 3-D fabric image created by the 3-D fabric image creation portion 103. The 3-D fabric image display control portion 104 reads out the 3-D fabric image stored in the 3-D fabric image memory portion 203, and outputs it to the 3-D fabric image display portion 401. The 3-D fabric image display portion 401 displays thereon the 3-D fabric image inputted from the 3-D fabric image display control portion 104.

The car seat model memory portion 204 stores 3-D data of a car seat model comprising plural polygons within a virtual 3-D space. The image attachment portion 105 attaches the 3-D fabric image read out from the 3-D fabric image memory portion 203 to the car seat model read out from the car seat model memory portion 204. The car seat image memory portion 205 stores a car seat image created by attaching the 3-D fabric image to the car seat model by the image attachment portion 105.

The car seat image display control portion 106 reads out the car seat image stored in the car seat image memory portion 205, and outputs it to the car seat image display portion 402. The car seat image display portion 402 displays the car seat image inputted from the car seat image display control portion 106.

Figure 3:
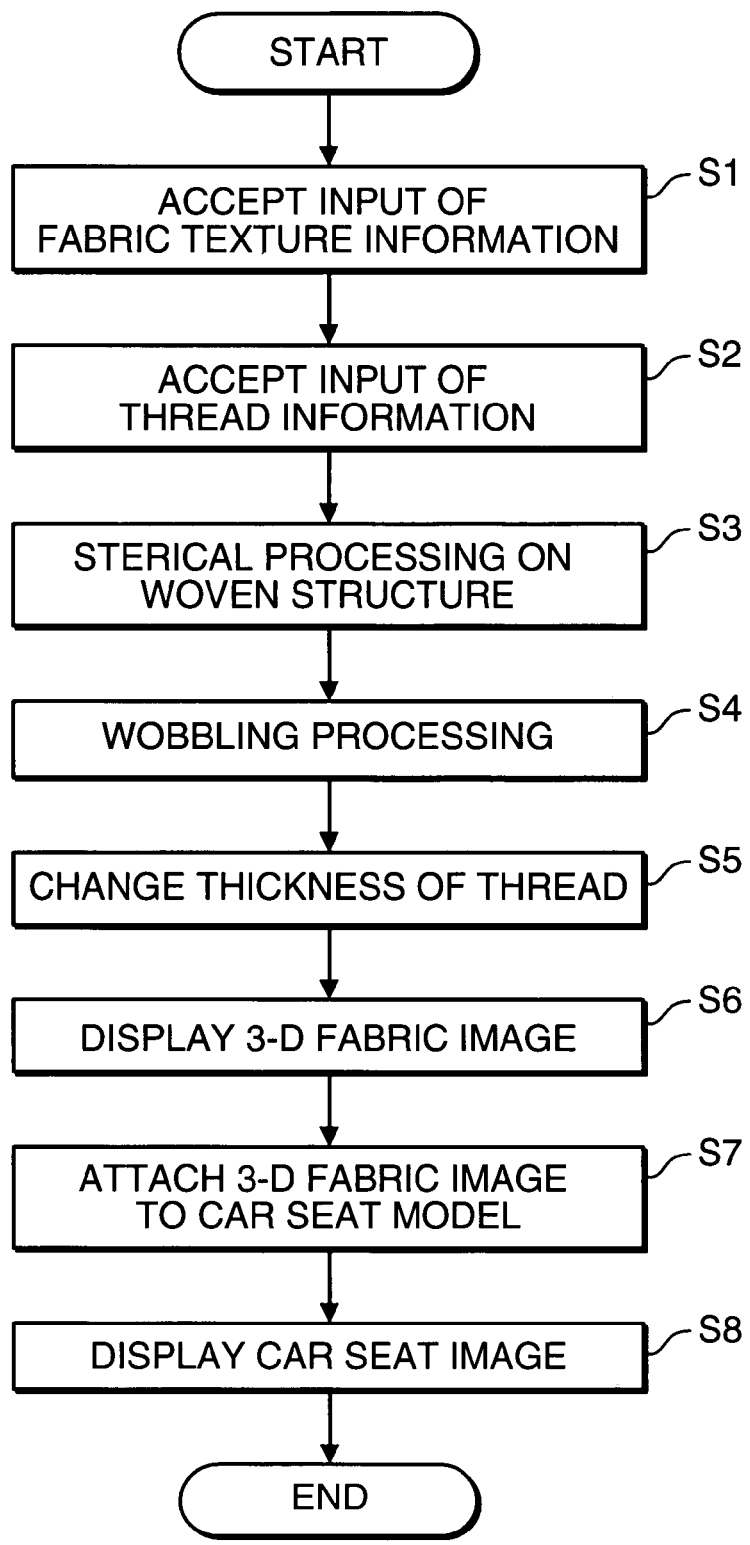
FIG. 3 is a flowchart used to describe car seat fabric simulation processing by the car seat fabric simulation device shown in FIG. 2.

The car seat fabric simulation processing will now be described. FIG. 3 is a flowchart used to describe the car seat fabric simulation processing by the car seat fabric simulation device shown in FIG. 2.

Initially, in Step S1, the fabric texture information acceptance portion 101 accepts an input of the fabric texture information from the user. The user inputs the fabric texture information using the input unit 300. The fabric texture information accepted at the fabric texture information input acceptance portion 101 is stored in the fabric texture information memory portion 201.

Figure 4:
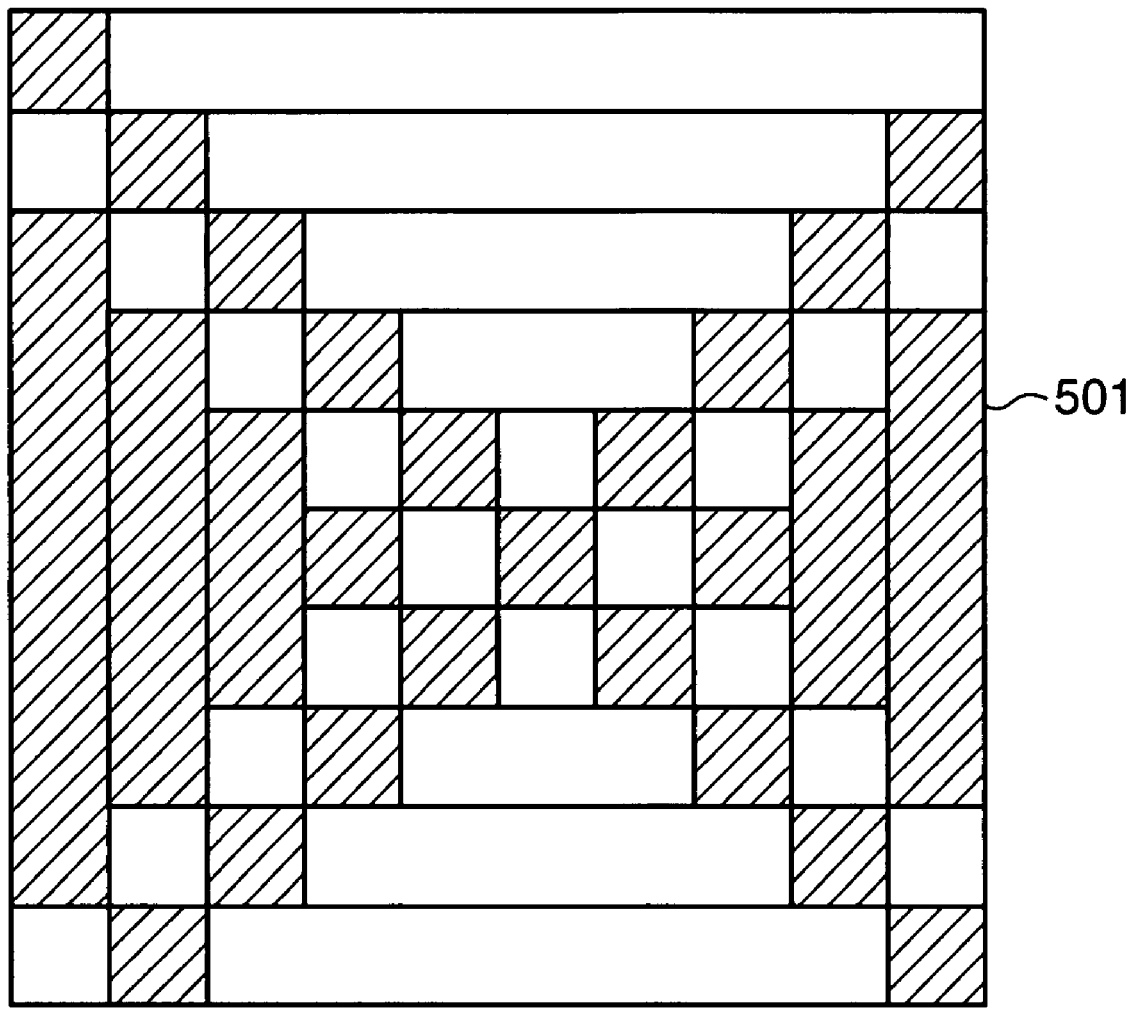
FIG. 4 is a view showing one example of the fabric texture.

The fabric texture information will be described herein. FIG. 4 is a view showing one example of the fabric texture.

The texture of the fabric can be represented by the texture diagram shown in FIG. 4. A fabric texture 501 shown in FIG. 4 is represented by an n by m matrix. The interlace state at the intersections of the threads of the warp and the threads of the weft is indicated by filling in (indicated by diagonal lines in FIG. 4) a cell at the position at which a thread of the warp and a thread of the weft cross each other with the former being afloat above the latter on the assumption that a space between lines represents one thread. The fabric texture information is the information indicating, as is shown in FIG. 4, which of the threads of the warp and the threads of the weft pass over the other at the intersections at which the threads of the warp and the threads of the weft cross each other.

Referring to FIG. 3 again, in Step S2, the thread information input acceptance portion 102 accepts an input of the thread information from the user. The user inputs the thread information using the input unit 300. The thread information accepted at the thread information input acceptance portion 102 is stored in the thread information memory portion 202.

The thread information will be described herein. The thread information includes information about the kind of the threads and the thickness of the threads. Inputted as the kind of the threads are, for example, the manufacturer name that manufactures the threads, the material name of the threads, the color of the threads, and whether the threads are filaments, staples, or fancy yarns. Also, inputted as the thickness of the threads are, for example, the thread size, deniers, the F count, whether the threads are twisted yarn, and the twist count in the case of the twisted yarn.

Subsequently, in Step S3, the sterical processing portion 107 performs sterical processing on the woven structure. To be more concrete, the sterical processing portion 107 reads out the thread information from the thread information memory portion 202, and calculates tensile forces of the threads of the warp and threads of the weft forming the car seat fabric. The sterical processing portion 107 then reads out the fabric texture information from the fabric texture information memory portion 201, and finds the position coordinates of the threads of the warp and the threads of the weft in the respective cells of the fabric texture within the 3-D space included in the fabric texture information thus read on the basis of the calculated tensile forces.

Subsequently, in Step S4, the wobbling processing portion 108 performs the wobbling processing on the woven structure. To be more concrete, the wobbling processing portion 108 wobbles the threads of the warp by linking the position coordinates of the threads of the warp in the respective cells of the fabric texture within the 3-D space found by the sterical processing portion 107 with a curve, and wobbles the threads of the weft by linking the position coordinates of the threads of the weft in the respective cells of the fabric texture within the 3-D space found by the sterical processing portion 107 with a curve. The curve linking the position coordinates of the threads of the warp is the thread axis passing through the center points of the cross sections of the threads of the warp, and the curve linking the position coordinates of the threads of the weft is the thread axis passing through the center points of the cross sections of the threads of the weft. In a case where the threads of the warp and the threads of the weft forming the car seat fabric cross each other, the wobbling processing portion 108 changes the shape of a thread according to the tensile forces acting on each thread and a pressure acting inside the cross section of each thread. In a case where the interval between the center points of the cross sections perpendicular to the woven planes of a thread and the adjacent thread is smaller than the thickness (diameter) of the thread, it changes the shape of the thread on the basis of a repulsive force corresponding to an elastic force of each thread.

As has been described, in a case where the threads of the warp and the threads of the weft forming the car seat fabric cross each other, the shape of a thread is changed on the basis of the tensile force acting on each thread and the pressure acting inside the cross section of each thread. In a case where the interval of the center points of the cross sections of a thread and the adjacent thread is smaller than the thickness of the thread, the shape of the thread is changed on the basis of the repulsive force corresponding to the elastic force of each thread. Hence, by deforming the shapes of the threads of the warp and the threads of the weft forming the car seat fabric according to the force acting on each, it is possible to obtain the woven structure closer to the real one.

Also, when the threads of the warp pass over or under the threads of the weft, the wobbling processing portion 108 compares the inclination of a thread of the warp before the passing with the inclination of the thread of the warp after the passing, and applies a force to a thread of the weft from the side having the larger inclination to the side having the smaller inclination. In a case where the threads of the weft pass over or under the threads of the warp, it compares the inclination of a thread of the weft before the passing and the inclination of the thread of the weft after the passing, and applies a force to a thread of the warp from the side having the larger inclination to the side having the smaller inclination.

Figure 5:
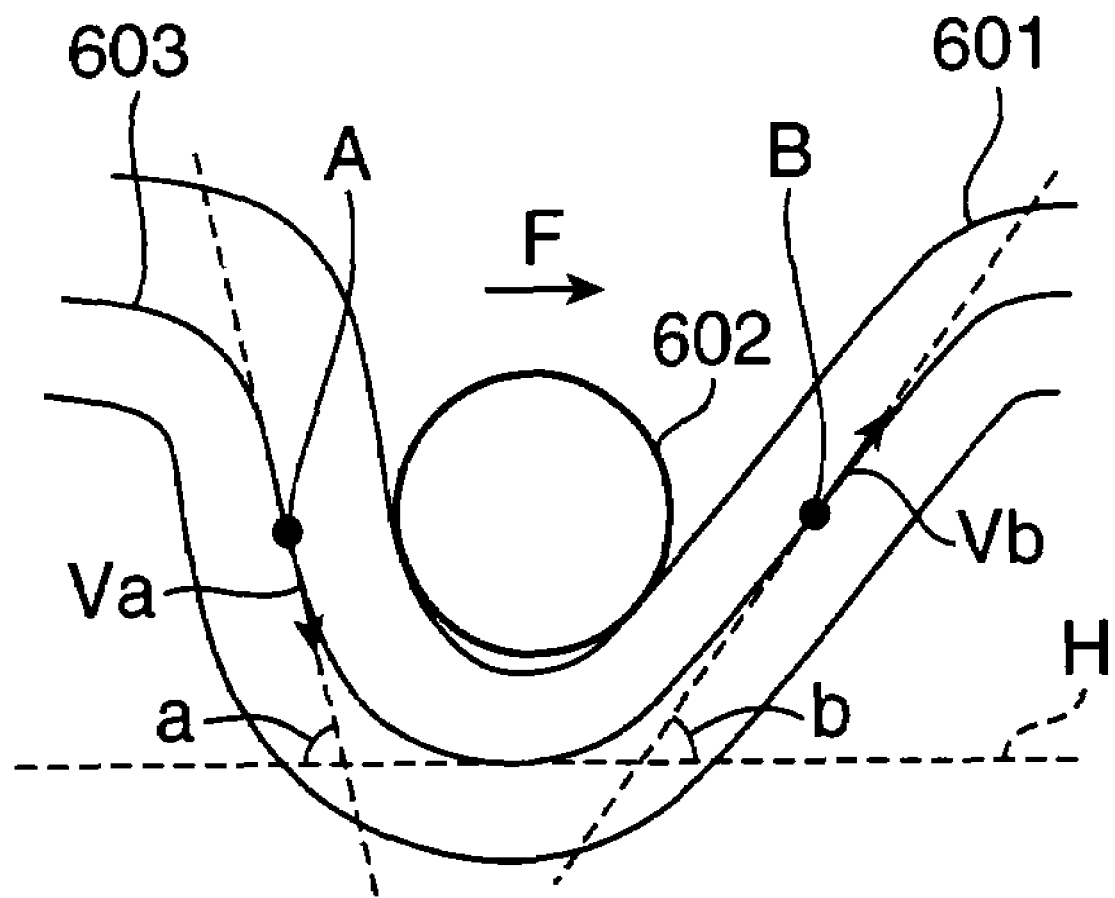
FIG. 5 is a view used to describe a force acting on a thread of the weft in a case where the threads of the warp pass under the threads of the weft.

FIG. 5 is a view used to describe a force acting on a thread of the weft in a case where the threads of the warp pass under the threads of the weft. In FIG. 5, a thread of the warp 601 passes under a thread of the weft 602. In a case where the thread of the warp 601 passes under the thread of the weft 602, the wobbling processing portion 108 compares an inclination a of the thread of the warp 601 before the passing with an inclination b of the thread of the warp 601 after the passing. To be more specific, as is shown in FIG. 5, the wobbling processing portion 108 finds the angle (inclination) a produced between the vector va in a direction perpendicular to the cross section of the thread of the warp 601 before the passing and the woven plane H at a given point A on the thread axis 603 passing through the center point of the cross section, and also finds the angle (inclination) b produced between the vector vb in a direction perpendicular to the cross section of the thread of the warp 601 after the passing and the woven plane H at a given point B on the thread axis 603 passing through the center of the cross section to compare the inclination a with the inclination b. As a result of the comparison between the inclination a and the inclination b in largeness, the wobbling processing portion 108 applies a force from the side having the larger inclination to the side having the smaller inclination. Referring to FIG. 5, because the inclination a is larger than the inclination b (a>b), a force F is applied to the thread of the weft 602 in the rightward direction of FIG. 5, and the weft 602 consequently moves in the rightward direction. When the inclination a is smaller than the inclination b (a<b), a force F is applied to the thread of the weft 602 in the leftward direction of FIG. 5, and the weft 602 consequently moves in the leftward direction.

As has been described, in a case where a first thread passes over or under a second thread, the largeness of the inclination of the first thread before the passing is compared with the largeness of the inclination of the first thread after the passing, and a force is applied to the second thread from the side having the larger inclination to the side having the smaller inclination so as to be moved in the direction in which the force is applied. Accordingly, in a case where a first thread passes over or under a second thread, it is possible to determine the direction of a force acting on the second thread by comparing the largeness of the inclination of the first thread before the passing and the largeness of the inclination of the first thread after the passing.

Figure 6A:
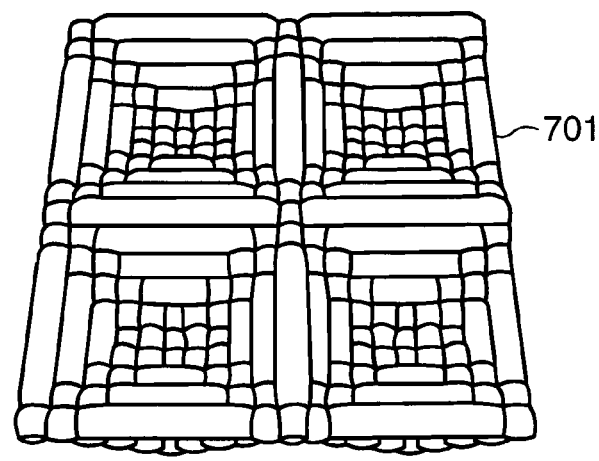
FIG. 6 is a view used to compare a car seat fabric to which wobbling processing is applied and a car seat fabric to which the wobbling processing is not applied.
Figure 6B:
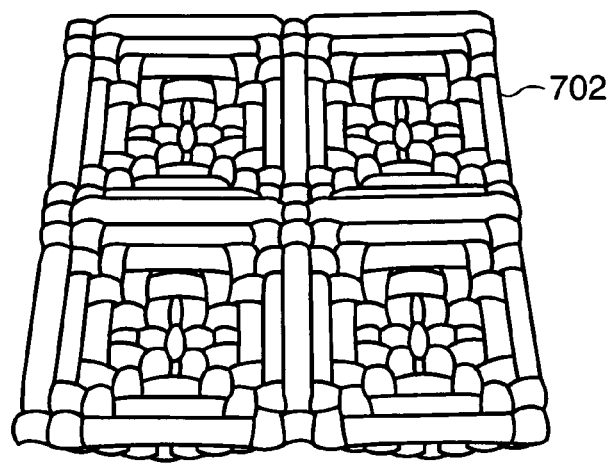
Figure 6C:
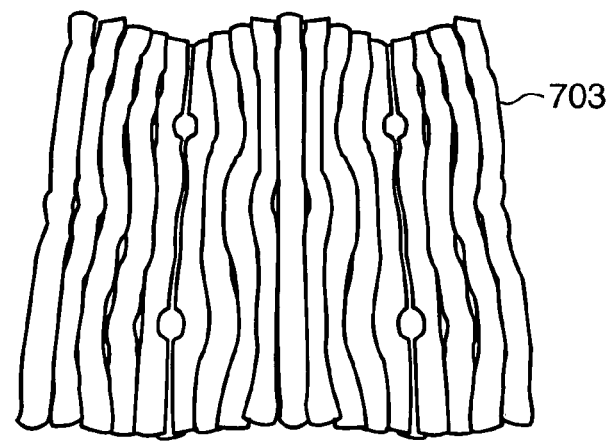

FIG. 6 is a view used to compare a car seat fabric to which the wobbling processing is applied with a car seat fabric to which the wobbling processing is not applied. FIG. 6A is a view showing the car seat fabric to which the wobbling processing is not applied. FIG. 6B is a view showing the car seat fabric to which the wobbling processing is applied. FIG. 6C is a view showing only the threads of the warp of the car seat fabric shown in FIG. 6B.

As is shown in FIG. 6A, a woven structure 701 of the car seat fabric, to which is applied the sterical processing that is applied before the wobbling processing, is transformed into a steric form by moving the positions of the threads only in a direction perpendicular to the woven plane. Hence, the woven structure 701 of the car seat fabric to which the wobbling processing is not applied cannot fully reflect a woven structure in three dimensions in which the threads of the warp and the threads of the weft have an effect on each other, thereby lacking a feeling of reality. On the contrary, as is shown in FIG. 6B, when the wobbling processing is applied, the threads of the warp and the threads of the weft have an effect on each other in a woven structure 702 of the car seat fabric, and a feeling of reality is obtained. In addition, as is shown in FIG. 6C, in a case where the wobbling processing is applied, a thread of the warp 703 wobbles due to a pressure from a thread of the weft and a repulsive force corresponding to an elastic force of the adjacent thread of the warp.

Subsequently, in Step S5, the sectional shape changing processing portion 109 performs the sectional shape changing processing to change the sectional shapes of the threads of the warp and the threads of the weft forming the car seat fabric. To be more concrete, the sectional shape changing processing portion 109 reads out the thread information from the thread information memory portion 202, and determines the thicknesses of the threads of the warp and the threads of the weft according to the thickness of the threads included in the thread information thus read. In this instance, in a case where the threads of the warp pass over or under the threads of the weft, the sectional shape changing processing portion 109 determines the thickness of a thread of the weft according to the inclination of a thread of the warp before the passing and the inclination of the thread of the warp after the passing, and in a case where the threads of the weft pass over or under the threads of the warp, it determines the thickness of a thread of the warp according to the inclination of a thread of the weft before the passing and the inclination of the thread of the weft after the passing. In other words, in a case where the threads of the warp pass over or under the threads of the weft, the sectional shape changing processing 109 compares an interval between a thread of the warp before the passing and the thread of the warp after the passing with a pre-set thickness of the threads. When the interval between the thread of the warp before the passing and the thread of the warp after the passing is shorter than the pre-set thickness of the threads, it changes the thickness (sectional shape) of the thread according to the interval in a direction parallel to the woven plane. Also, in a case where the threads of the warp and the threads of the weft cross each other, the sectional shape changing processing 109 changes the thickness of a second thread in a direction perpendicular to the woven plane at the intersection position according to a force induced by tensile forces of the threads the warp and the threads of the weft and exerted from a first thread of one of the warp and the weft on the second thread of the other. As has been described, the sectional shape changing processing portion 109 finds a force in the horizontal direction acting on the second thread of the other one of the warp and the weft according to the inclination of the first thread of one of the warp and the weft, and determines the length of the thread in the horizontal direction according to the force in the horizontal direction thus found. It then finds a force in the vertical direction acting on each thread according to the tensile forces of the threads of the warp and the threads of the weft, and determines the length of the thread in the vertical direction according to the force in the vertical direction thus found. The sectional shape of the thread is thus determined on the basis of the lengths in the horizontal direction and in the vertical direction thus determined.

In this embodiment, the sectional shape of a thread is approximated by an ellipse using one of the length in the horizontal direction and the length in the vertical direction as the major axis and the other as the minor axis. The invention, however, is not particularly limited to this configuration, and a complex shape closer to the real one may be found through calculations.

The sectional shape changing processing portion 109 then creates polygon data of the car seat fabric, and stores the polygon data thus created into the 3-D fabric image memory portion 203 as the 3-D fabric image data. In this instance, a 3-D fabric image as is shown in FIG. 6B is stored in the 3-D fabric image memory portion 203.

As has been described, in a case where a first thread of one of the warp and the weft passes over or under a second thread of the other, because the thickness of the second thread is determined according to the inclination of the first thread before the passing and the inclination of the first thread after the passing, it is possible to determine an appropriate thickness for the thickness of the second thread placed under restraint of the first thread.

Subsequently, in Step S6, the 3-D fabric image display control portion 104 reads out the 3-D fabric image data stored in the 3-D fabric image memory portion 203, and outputs the 3-D fabric image data thus read to the 3-D fabric image display portion 401. The 3-D fabric image display portion 401 virtually displays a steric structure of the car seat fabric texture according to the 3-D fabric image data outputted from the 3-D fabric image display control portion 104. In this instance, the 3-D fabric image as is shown in FIG. 6B is displayed on the 3-D fabric image display portion 401. When the 3-D fabric image is displayed, the 3-D fabric image data is subject to rendering. The 3-D fabric image display control portion 104, however, performs preliminary calculations to calculate in advance a radiance table for the surfaces of each thread and the respective portions in a space including the threads to omit the ray tracing in the direction toward the light source. It is thus possible to increase the speed of rendering and reduce the calculation costs markedly.

The rendering method applicable in this embodiment is not limited to the one described above, and other existing rendering methods can be used as well.

Subsequently, in Step S7, the image attachment portion 105 reads out the 3-D fabric image data stored in the 3-D fabric image memory portion 203, and reads out the car seat model stored in the car seat model memory portion 204. It then replaces the 3-D fabric image thus read with a volume space, and attaches the 3-D fabric image within the replaced volume space to the car seat model through the 3-D texture mapping. The 3-D fabric image data in the minimum unit of the fabric texture is stored in the 3-D fabric image memory portion 203, and the image attachment portion 105 creates a car seat image in which the 3-D fabric image is attached to the car seat model by attaching plural 3-D fabric images in the minimum unit combined according to the size of the car seat model. The image attachment portion 105 creates polygon data of the car seat exhibiting the car seat model attached with the 3-D fabric image, and stores the polygon data thus created into the car seat image memory portion 205 as the car seat image data.

Subsequently, in Step S8, the car seat image display control portion 106 reads out the car seat image data stored in the car seat image memory portion 205, and outputs the car seat image data thus read to the car seat image display portion 402. The car seat image display portion 402 virtually displays thereon a car seat to which the car seat fabric is attached on the surface thereof according to the car seat image data outputted from the car seat image display control portion 106.

Figure 7:
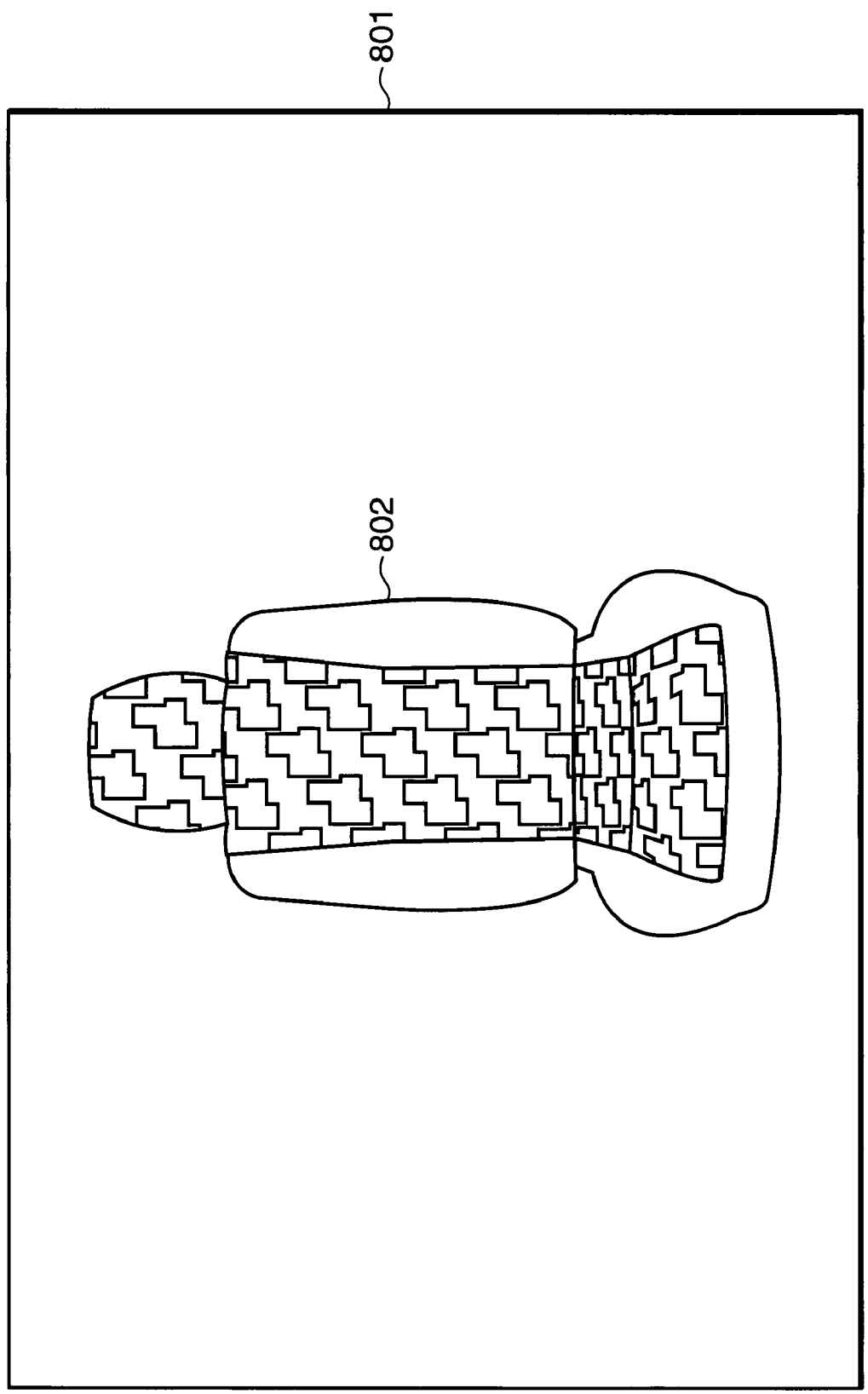
FIG. 7 is a view showing one example of a car seat image displayed on the display screen when a car seat model attached with the car seat fabric is virtually displayed.

FIG. 7 is a view showing one example of a car seat image displayed on the display screen in a case where the car seat model attached with the car seat fabric is virtually displayed. As is shown in FIG. 7, a car seat image 802 attached with the 3-D fabric image of the car seat fabric is displayed on the display screen 801 while the 3-D structure thereof is being simulated. Even the irregularities of the fabric are thus simulated realistically in the car seat image 802.

As has been described, an input of the fabric texture information about the fabric texture used for the car seat fabric is accepted, and an input of the thread information about the threads used for the car seat fabric is accepted. The steric structure of the car seat fabric within the 3-D space is created as the 3-D fabric image on the basis of the accepted texture information and the accepted thread information. The 3-D fabric image thus created is attached to the car seat model, and the car seat model attached with the 3-D fabric image is displayed.

It is thus possible to simulate the car seat fabric with a feeling of reality, and by virtually displaying the car seat using the car seat fabric, the need to produce actual trial products of the car seat fabric can be eliminated. The cost needed to actually manufacture the trial products can be therefore reduced.

In addition, because the sterical processing portion 107 transforms the woven structure into a steric form on the basis of the texture information about the fabric texture used for the car seat fabric, and the wobbling processing portion 108 wobbles the threads of the warp and the threads of the weft forming the car seat fabric, plus the sectional shape changing processing portion 109 changes the thickness of a second thread on the basis of a force exerted from a first thread of one of the warp and the weft on the second thread of the other, it is possible to virtually reproduce the woven structure of the car seat fabric with a feeling of reality.

Figure 8:
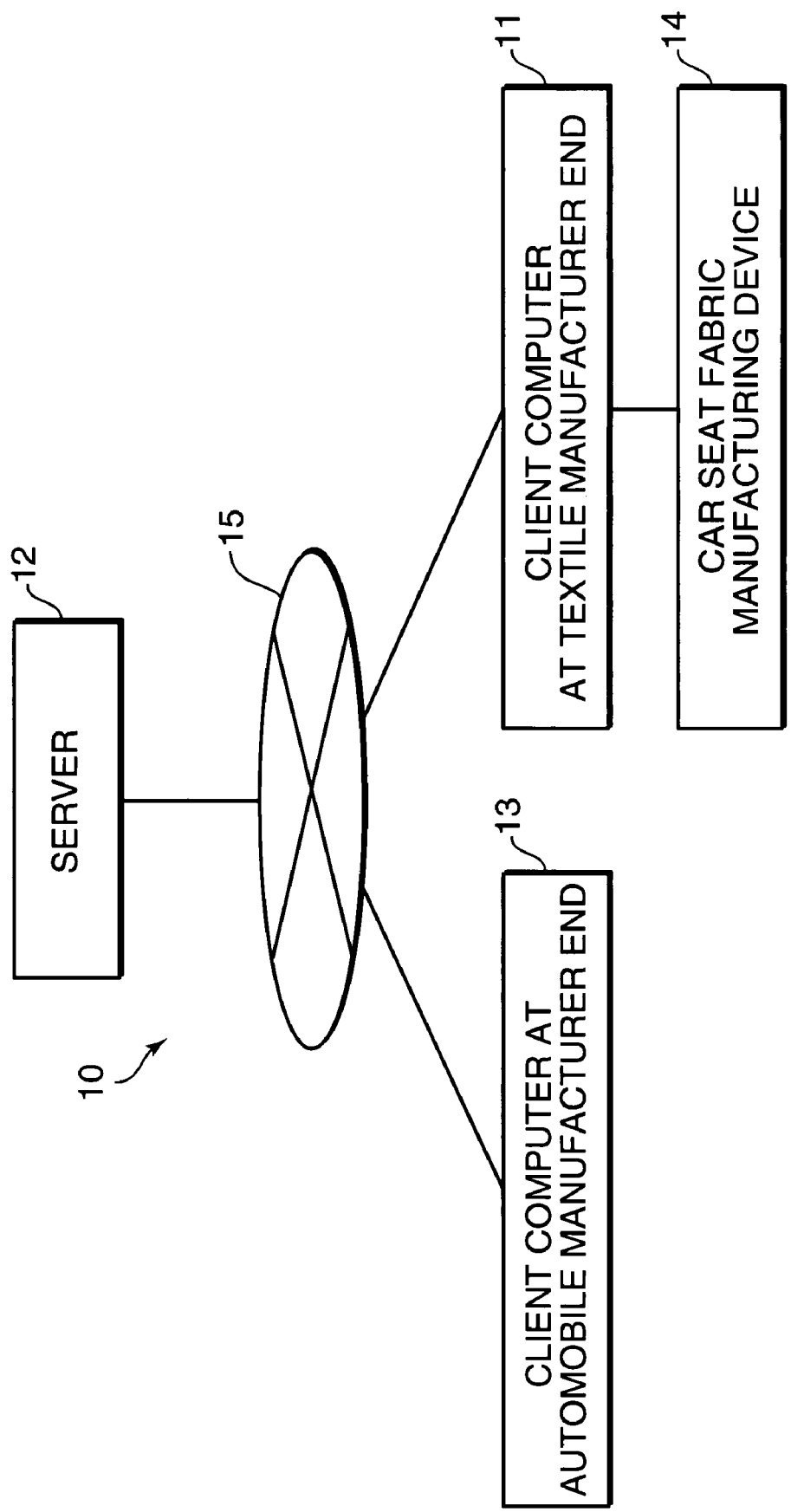
FIG. 8 is a view showing the overall configuration of a car seat fabric trading system of the invention.

A car seat fabric trading system for trading the car seat fabric between the textile manufacturer and the automobile manufacturer will now be described. FIG. 8 is a view showing the overall configuration of the car seat fabric trading system of the invention. A car seat fabric trading system 10 shown in FIG. 8 comprises a client computer 11 at the textile manufacturer end, a server 12, a client computer 13 at the automobile manufacturer end, and a car seat fabric manufacturing device 14. The client computer 11 at the textile manufacturer end, the server 12, and the client computer 13 at the automobile manufacturer end are interconnected via a network 15 to enable mutual communications.

As the network 15, for example, the Internet is used, so that various kinds of information or the like are mutually transmitted and received between the server 12 and the client computer 11 at the textile manufacturer end, and various kinds of information or the like are mutually transmitted and received between the server 12 and the client computer 13 at the automobile manufacturer end according to the TCP/IP (Transmission Control Protocol/Internet Protocol). The network 15 is not particularly limited to the Internet, and it can be another network, such as the intranet, or a network constructed by combining various networks, such as the Internet and the intranet. Alternatively, the server 12, the client computer 11 at the textile manufacturer end, and the client computer 13 at the automobile manufacturer end may be interconnected via a private line.

In a case where the Internet is used as the network 15, the client computer 11 at the textile manufacturer end and the client computer 13 at the automobile manufacturer end are normally connected to a specific provider server via a modem or the like in many cases, so that they are connected to the network 15 by way of this provider server. However, for ease of descriptions, the provider server is not shown and the description thereof is omitted herein.

The client computer 11 at the textile manufacturer end and the client computer 13 at the automobile manufacturer end comprise a typical personal computer or the like, and each includes a ROM, a CPU, a RAM, an external memory device, an input portion, a communication portion, a display portion, and a recording medium driving device. The server 12 comprises a typical server device or the like, and includes a ROM, a CPU, a RAM, an external memory device, and a communication portion. The car seat fabric manufacturing device 14 automatically manufactures the car seat fabric upon input of information about the car seat fabric.

Figure 9:
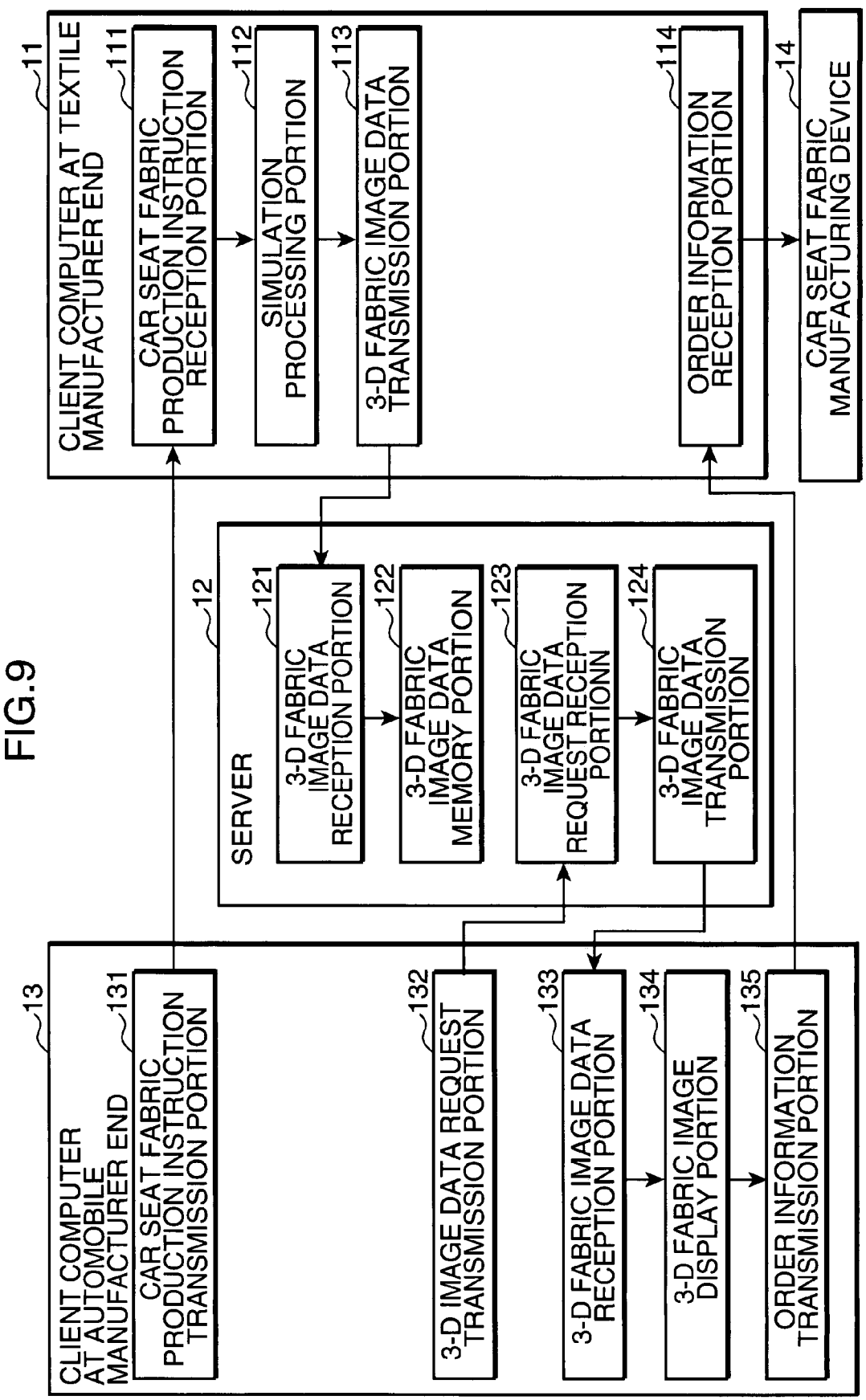
FIG. 9 is a block diagram showing the configuration of the car seat fabric trading system of the invention.

FIG. 9 is a block diagram showing the configuration of the car seat fabric trading system of the invention.

The client computer 11 at the textile manufacturer end comprises a car seat fabric production instruction reception portion 111 that receives a car seat fabric production instruction transmitted from the client computer 13 at the automobile manufacturer end, a simulation processing portion 112 that simulates the 3-D woven structure of the car seat fabric, a 3-D fabric image data transmission portion 113 that transmits the 3-D fabric image data to the server 12, and an order information reception portion 114 that receives order information transmitted from the client computer 13 at the automobile manufacturer end. The simulation processing portion 112 is furnished with the same function as that of the car seat fabric simulation device shown in FIG. 2.

The server 12 comprises a 3-D fabric image data reception portion 121 that receives the 3-D fabric image data transmitted from the client computer 11 at the textile manufacturer end, a 3-D fabric image data memory portion 122 that stores the 3-D fabric image data received at the 3-D fabric image data reception portion 121, a 3-D fabric image data request reception portion 123 that receives a 3-D fabric image data request transmitted from the client computer 13 at the automobile manufacturer end, and a 3-D fabric image data transmission portion 124 that reads out the 3-D fabric image data stored in the 3-D fabric image data memory portion 122 and transmits the 3-D fabric image data thus read to the client computer 13 at the automobile manufacturer end.

The client computer 13 at the automobile manufacturer end comprises a car seat fabric production instruction transmission portion 131 that transmits a car seat fabric production instruction to the client computer 11 at the textile manufacturer end, a 3-D fabric image data request transmission portion 132 that transmits a 3-D fabric image data request to the server 12, a 3-D fabric image data reception portion 133 that receives the 3-D fabric image data transmitted from the server 12, a 3-D fabric image display portion 134 that displays the 3-D fabric image received at the 3-D fabric image data reception portion 133, and an order information transmission portion 135 that transmits order information to place an order for the car seat fabric to the client computer 11 at the textile manufacturer end.

Operations of the car seat fabric trading system will now be described. Initially, the car seat fabric production instruction transmission portion 131 transmits a car seat fabric production instruction to the client computer 11 at the textile manufacturer end. Subsequently, the car seat fabric production instruction reception portion 111 in the client computer 11 at the textile manufacturer end receives the car seat fabric production instruction transmitted from the client computer 13 at the automobile manufacturer end. Upon receipt of the car seat fabric production instruction, the simulation processing portion 112 executes the simulation processing of the 3-D woven structure of the car seat fabric. Because this simulation processing is the same as the processing shown in FIG. 3, the description thereof is omitted herein.

Subsequently, the 3-D fabric image data transmission portion 113 transmits the 3-D fabric image data obtained as the simulation processing is executed by the simulation processing portion 112 to the server 12. The 3-D fabric image data reception portion 121 in the server 12 receives the 3-D fabric image data transmitted from the client computer 11 at the textile manufacturer end. The 3-D fabric image data memory portion 122 stores the 3-D fabric image data received at the 3-D fabric image data reception portion 121.

Subsequently, the 3-D fabric image data request transmission portion 132 in the client computer 13 at the automobile manufacturer end transmits a 3-D fabric image data request to the server 12. The 3-D fabric image data request reception portion 123 in the server 12 receives the 3-D fabric image data request transmitted from the client computer 13 at the automobile manufacturer end. Upon receipt of the 3-D fabric image data request, the 3-D fabric image data transmission portion 124 reads out the 3-D fabric image data stored in the 3-D fabric image data memory portion 122, and transmits the 3-D fabric image data thus read to the client computer 13 at the automobile manufacturer end.

Subsequently, the 3-D fabric image data reception portion 133 in the client computer 13 at the automobile manufacturer end receives the 3-D fabric image data transmitted from the server 12. The 3-D fabric image display portion 134 displays thereon the 3-D fabric image received at the 3-D fabric image data reception portion 133. The user is thus able to confirm the woven structure of the car seat fabric by seeing the 3-D fabric image being displayed by the 3-D fabric image display portion 134.

Whether an order is placed for the car seat fabric being displayed by the 3-D fabric image display portion 134 is then accepted. In a case where an order is not placed for the car seat fabric, the car seat fabric production instruction is transmitted again to the client computer 11 at the textile manufacturer end by the car seat fabric production instruction transmission portion 131. In a case where an order is placed for the car seat fabric, the order information transmission portion 135 transmits order information to place an order for the car seat fabric to the client computer 11 at the textile manufacturer end.

The order information reception portion 114 in the client computer 11 at the textile manufacturer end then receives the order information transmitted from the client computer 13 at the automobile manufacturer end. Upon receipt of the order information, the car seat fabric manufacturing device 14 starts to manufacture the car seat fabric simulated by the simulation processing portion 112. The car seat fabric manufacturing device 14 manufactures the car seat fabric using the thread information and the fabric texture information whose inputs were accepted when the simulation was performed. The car seat fabric manufactured by the car seat fabric manufacturing device 14 is delivered to the automobile manufacturer.

As has been described, the 3-D woven structure of the car seat fabric is simulated by the simulation processing portion 112, and the car seat fabric is manufactured by a car seat fabric manufacturing device 14 using the 3-D woven structure of the car seat fabric that was simulated. It is thus possible to design and manufacture the car seat fabric without the need to actually produce trial products.

The 3-D woven structure of the car seat fabric is simulated by the simulation processing portion 112, and the order information instructing to manufacture the car seat fabric being simulated is transmitted by the order information transmission portion 135. The order for the manufacturing of the car seat fabric is accepted upon receipt of the transmitted order information at the order information reception portion 114. The car seat fabric is then manufactured by the car seat fabric manufacturing device 14 using the 3-D woven structure of the car seat that was simulated.

It is thus possible to place an order for the manufacturing of the car seat fabric after the user confirms the 3-D woven structure of the car seat fabric being simulated, and the car seat fabric can be manufactured using the 3-D woven structure of the car seat fabric that was simulated. A delivery of the car seat fabric thus manufactured is thus enabled.

In this embodiment, the client computer 11 at the textile manufacturer end and the client computer 13 at the automobile manufacturer end mutually transmit and receive the 3-D fabric image data via the server 12. The invention, however, is not particularly limited to this configuration, and the client computer 11 at the textile manufacturer end and the client computer 13 at the automobile manufacturer end may bypass the server 12 and mutually transmit and receive the 3-D fabric image data directly.

Also, in this embodiment, the car seat fabric manufacturing device 14 manufactures the car seat fabric as the order information transmission portion 135 in the client computer 13 at the automobile manufacturer end transmits the order information to place an order for the car seat fabric to the client computer 11 at the textile manufacturer end, and the order information reception portion 114 in the client computer 11 at the textile manufacturer end receives the order information. The invention, however, is not particularly limited to this configuration, and it may be configured in such a manner that the processing ends after the 3-D fabric image display portion 134 in the client computer 13 at the automobile manufacturer end displays the 3-D fabric image.

Further, in a case where plural client computers 11 at the textile manufacturer end, the client computer 13 at the automobile manufacturer end, and the server 12 are interconnected to enable communications, the 3-D fabric image data created by the plural client computers 11 at the textile manufacturer end is transmitted to the server 12, and the server 12 transmits the 3-D fabric image data created by the respective client computers 11 at the textile manufacturer end to the client computer 13 at the automobile manufacturer end, so that the client computer 13 at the automobile manufacturer end displays the 3-D fabric images created by the respective client computers 11 at the textile manufacturer end upon receipt of the 3-D fabric image data. In this case, the client computer 13 at the automobile manufacturer end displays the 3-D fabric images created by the respective client computers 11 at the textile manufacturer end in a selectable manner, so that the selection of one 3-D fabric image from the user is accepted and the order information is transmitted to the client computer 11 at the textile manufacturer end that created the selected 3-D fabric image.

As has been described above, a recording medium storing a car seat fabric simulation program of the invention is a recording medium storing a car seat fabric simulation program to simulate a 3-D woven structure of a car seat fabric, causing a computer to function as: texture information input acceptance means for accepting an input of texture information about a fabric texture used for the car seat fabric; thread information input acceptance means for accepting an input of thread information about threads used for the car seat fabric; 3-D fabric image creation means for creating a steric structure of the car seat fabric within a 3-D space as a 3-D fabric image on the basis of the texture information accepted at the texture information input acceptance means and the thread information accepted at the thread information input acceptance means; image attachment means for attaching the 3-D fabric image created by the 3-D fabric image creation means to a car seat model; and display means for displaying thereon the car seat model to which the 3-D fabric image is attached by the image attachment means.

According to this configuration, an input of the texture information about the fabric texture used for the car seat fabric is accepted, and an input of the thread information about the threads used for the car seat fabric is accepted. The steric structure of the car seat fabric within a 3-D space is created as a 3-D fabric image on the basis of the accepted texture information and the accepted thread information. The 3-D fabric image thus created is attached to a car seat model, and the car seat model attached with the 3-D fabric image is displayed.

It is thus possible to simulate the car seat fabric with a feeling of reality, and the need to produce actual trial products of the car seat fabric is eliminated by virtually displaying the car seat using the car seat fabric. The cost needed to actually manufacture the trial products can be therefore reduced.

Also, in the recording medium storing the car seat fabric simulation program described above, it is preferable that the 3-D fabric image creation means transforms a woven structure into a steric form on the basis of the texture information, wobbles threads of warp and threads of weft forming the car seat fabric, and changes a thickness of a second thread at an intersection of a thread of the warp and a thread of the weft on the basis of a force exerted from a first thread of one of the warp and the weft on the second thread of the other.

According to this configuration, the woven structure is transformed into a steric form on the basis of the texture information about the fabric texture used for the car seat fabric, and the threads of the warp and the threads of the weft forming the car seat fabric are wobbled, plus the thickness of the second thread is changed on the basis of a force exerted from the first thread of one of the warp and the weft on the second thread of the other. It is thus possible to virtually reproduce the woven structure of the car seat fabric with a feeling of reality.

Also, in the recording medium storing the car seat fabric simulation program described above, it is preferable that in a case where threads of warp and threads of weft forming the car seat fabric cross each other, the 3-D fabric image creation means changes a shape of a thread on the basis of a tensile force acting on each thread and a pressure acting inside a cross section of each thread, and in a case where an interval between center points of cross sections of a thread and an adjacent thread is smaller than a thickness of the thread, the 3-D fabric image creation means changes the shape of the thread on the basis of a repulsive force corresponding to an elastic force of each thread.

According to this configuration, in a case where the threads of the warp and the threads of the weft forming the car seat fabric cross each other, the shape of a thread is changed on the basis of a tensile force acting on each thread and a pressure acting inside the cross section of each thread, and in a case where the interval between the center points of the cross sections of a thread and the adjacent thread is smaller than the thickness of the thread, the shape of the thread is changed on the basis of a repulsive force corresponding to an elastic force of each threads. Hence, by deforming the shapes of the threads of the warp and the threads of the weft forming the car seat fabric independently according to a force acting on each thread, it is possible to make the woven structure closer to the real one.

Also, in the recording medium storing the car seat fabric simulation program described above, it is preferable that in a case where a first thread passes over or under a second thread, the 3-D fabric image creation means compares a largeness of an inclination of the first thread before passing and a largeness of an inclination of the first thread after the passing, and applies a force from a side having a larger inclination to a side having a smaller inclination.

According to this configuration, when a first thread passes over or under a second thread, the largeness of the inclination of the first thread before the passing and the largeness of the inclination of the first thread after the passing are compared with each other, and a force is applied to the second thread from the side having the larger inclination to the side having the smaller inclination so as to be moved in a direction in which the force is applied. Hence, when the first thread passes over or under the second thread, it is possible to determine the direction of a force acting on the second thread by comparing the largeness of the inclination of the first thread before the passing and the largeness of the inclination of the first thread after the passing.

Also, in the recording medium storing the car seat fabric simulation program described above, it is preferable that in a case where a first thread passes over or under a second thread, the 3-D fabric image creation means determines a thickness of the second thread according to an inclination of the first thread before passing and an inclination of the first thread after the passing.

According to this configuration, in a case where a first thread of one of the warp and the weft passes over or under a second thread of the other, the thickness of the second thread is determined according to the inclination of the first thread before the passing and the inclination of the frit thread after the passing. It is thus possible to determine an appropriate thickness for the thickness of the second thread placed under restraint of the first thread.

A car seat fabric simulation method of the invention is a car seat fabric simulation method for simulating a 3-D woven structure of a car seat fabric, including: a texture information input acceptance step of accepting an input of texture information about a fabric texture used for the car seat fabric by a computer; a thread information input acceptance step of accepting an input of thread information about threads used for the car seat fabric by the computer; a 3-D fabric image creation step of creating a steric structure of the car seat fabric within a 3-D space as a 3-D fabric image by the computer on the basis of the texture information accepted in the texture information input acceptance step and the thread information accepted in the thread information acceptance step; an image attachment step of attaching the 3-D fabric image created in the 3-D fabric image creation step to a car seat model by the computer; and a display step of displaying the car seat model to which the 3-D fabric image is attached in the image attachment step by the computer.

According to this configuration, an input of the texture information about the fabric texture used for the car seat fabric is accepted, and an input of the thread information about the threads used for the car seat fabric is accepted. The steric structure of the car seat fabric within a 3-D space is created as the 3-D fabric image on the basis of the accepted texture information and the accepted thread information. The 3-D fabric image thus created is attached to a car seat model, and the car seat model attached with the 3-D fabric image is displayed.

It is thus possible to simulate the car seat fabric with a feeling of reality, and the need to produce actual trial products of the car seat fabric is eliminated by virtually displaying the car seat using the car seat fabric. The cost needed to actually manufacture the trial products can be therefore reduced.

A car seat fabric simulation device of the invention is a car seat fabric simulation device that simulates a 3-D woven structure of a car seat fabric, including: texture information input acceptance portion for accepting an input of texture information about a fabric texture used for the car seat fabric; thread information input acceptance portion for accepting an input of thread information about threads used for the car seat fabric; 3-D fabric image creation portion for creating a steric structure of the car seat fabric within a 3-D space as a 3-D fabric image on the basis of the texture information accepted at the texture information input acceptance portion and the thread information accepted at the thread information input acceptance portion; image attachment portion for attaching the 3-D fabric image created by the 3-D fabric image creation portion to a car seat model; and display portion for displaying thereon the car seat model to which the 3-D fabric image is attached by the image attachment portion.

According to this configuration, an input of the texture information about the fabric texture used for the car seat fabric is accepted, and an input of the thread information about the threads used for the car seat fabric is accepted. The steric structure of the car seat fabric within a 3-D space is created as the 3-D fabric image on the basis of the accepted texture information and the accepted thread information. The 3-D fabric image thus created is attached to a car seat model, and the car seat model attached with the 3-D fabric image is displayed.

It is thus possible to simulate the car seat fabric with a feeling of reality, and the need to produce actual trial products of the car seat fabric is eliminated by virtually displaying the car seat using the car seat fabric. The cost needed to actually manufacture the trial products can be therefore reduced.

A car seat fabric manufacturing method of the invention is a car seat fabric manufacturing method of manufacturing a car seat fabric using a car seat fabric manufacturing device, including a simulation step of simulating a 3-D woven structure of a car seat fabric by the car seat fabric simulation device set forth in claim 7, and a manufacturing step of manufacturing the car seat fabric by the car seat fabric manufacturing device using a 3-D woven structure of the car seat fabric simulated in the simulation step.

According to this configuration, the 3-D woven structure of the car seat fabric is simulated, and the car seat fabric is manufactured using a 3-D woven structure of the car seat being simulated. It is thus possible to design and manufacture the car seat fabric without the need to produce actual trial products.

A car seat fabric trading method of the invention is a car seat fabric trading system for trading a car seat fabric between a textile manufacturer and an automobile manufacturer, including: a simulation step of simulating a 3-D woven structure of a car seat fabric by the car seat fabric simulation device set forth in claim 7; an order information transmission step of transmitting order information providing an instruction to manufacture the car seat fabric simulated in the simulation step from a client computer at the automobile manufacturer end; an order information reception step of receiving the order information transmitted in the order information transmission step at a client computer at the textile manufacturer end; and a manufacturing step of manufacturing the car seat fabric by the car seat fabric manufacturing device using a 3-D woven structure of the car seat fabric simulated in the simulation step after the order information is received in the order information reception step.

According to this configuration, the 3-D woven structure of the car seat fabric is simulated, and order information providing an instruction to manufacture the car seat fabric being simulated is transmitted. The order for the manufacturing of the car seat fabric is accepted upon reception of the order information thus transmitted. After the order information is received, the car seat fabric is manufactured using the 3-D woven structure of the car seat fabric that was simulated.

It is thus possible to place an order for the manufacturing of the car seat fabric after the user confirms the 3-D woven structure of the car seat fabric being simulated, and the car seat fabric can be manufactured using the 3-D woven structure of the car seat fabric that was simulated. A delivery of the car seat fabric thus manufactured is thus enabled.

The invention claimed is:

1. A recording medium storing a car seat fabric simulation program to simulate a 3-D woven structure of a car seat fabric, causing a computer to function as:

texture information input acceptance means for accepting an input of texture information about a fabric texture used for the car seat fabric;

thread information input acceptance means for accepting an input of thread information about threads used for the car seat fabric;

3-D fabric image creation means for creating a steric structure of the car seat fabric within a 3-D space as a 3-D fabric image on the basis of the texture information accepted at the texture information input acceptance means and the thread information accepted at the thread information acceptance means;

image attachment means for attaching the 3-D fabric image created by the 3-D fabric image creation means to a car seat model; and display means for displaying thereon the car seat model to which the 3-D fabric image is attached by the image attachment means, wherein:

the 3-D fabric image creation means transforms a woven structure into a steric form on the basis of the texture information, changes the shape of threads of warp and threads of weft forming the car seat fabric, and changes a thickness of a second thread on the basis of a force exerted from a first thread of one of the warp and the weft to the second thread of the other.

2. A recording medium storing a car seat fabric simulation program to simulate a 3-D woven structure of a car seat fabric, causing a computer to function as:

texture information input acceptance means for accepting an input of texture information about a fabric texture used for the car seat fabric;

thread information input acceptance means for accepting an input of thread information about threads used for the car seat fabric;

3-D fabric image creation means for creating a steric structure of the car seat fabric within a 3-D space as a 3-D fabric image on the basis of the texture information accepted at the texture information input acceptance means and the thread information accepted at the thread information acceptance means;

image attachment means for attaching the 3-D fabric image created by the 3-D fabric image creation means to a car seat model; and display means for displaying thereon the car seat model to which the 3-D fabric image is attached by the image attachment means, wherein:

in a case where threads of warp and threads of weft forming the car seat fabric cross each other, the 3-D fabric image creation means changes a shape of a thread on the basis of a tensile force acting on each thread and a pressure acting inside a cross section of each thread, and in a case where an interval between center points of cross sections of a thread and an adjacent thread is smaller than a thickness of the thread, the 3-D fabric image creation means changes the shape of the thread on the basis of a repulsive force corresponding to an elastic force of each thread.

3. A recording medium storing a car seat fabric simulation program to simulate a 3-D woven structure of a car seat fabric, causing a computer to function as:

texture information input acceptance means for accepting an input of texture information about a fabric texture used for the car seat fabric;

thread information input acceptance means for accepting an input of thread information about threads used for the car seat fabric;

3-D fabric image creation means for creating a steric structure of the car seat fabric within a 3-D space as a 3-D fabric image on the basis of the texture information accepted at the texture information input acceptance means and the thread information accepted at the thread information acceptance means;

image attachment means for attaching the 3-D fabric image created by the 3-D fabric image creation means to a car seat model; and display means for displaying thereon the car seat model to which the 3-D fabric image is attached by the image attachment means, wherein:

in a case where a first thread passes over or under a second thread, the 3-D fabric image creation means compares a largeness of an inclination of the first thread before passing and a largeness of an inclination of the first thread after the passing, and applies a force from a side having a larger inclination to a side having a smaller inclination.

4. A recording medium storing a car seat fabric simulation program to simulate a 3-D woven structure of a car seat fabric, causing a computer to function as:

texture information input acceptance means for accepting an input of texture information about a fabric texture used for the car seat fabric;

thread information input acceptance means for accepting an input of thread information about threads used for the car seat fabric;

3-D fabric image creation means for creating a steric structure of the car seat fabric within a 3-D space as a 3-D fabric image on the basis of the texture information accepted at the texture information input acceptance means and the thread information accepted at the thread information acceptance means;

image attachment means for attaching the 3-D fabric image created by the 3-D fabric image creation means to a car seat model; and display means for displaying thereon the car seat model to which the 3-D fabric image is attached by the image attachment means, wherein:

in a case where a first thread passes over or under a second thread, the 3-D fabric image creation means determines a thickness of the second thread according to an inclination of the first thread before passing and an inclination of the first thread after the passing.

5. A car seat fabric manufacturing method of manufacturing a car seat fabric using a car seat fabric manufacturing device, comprising:

a simulation step of simulating a 3-D woven structure of a car seat fabric by a car seat fabric simulation device; and a manufacturing step of manufacturing the car seat fabric by the car seat fabric manufacturing device using the 3-D woven structure of the car seat fabric simulated in the simulation step, wherein the simulation step includes:

a texture information input acceptance step of accepting an input of texture information about a fabric texture used for the car seat fabric by the car seat fabric simulation device;

a thread information input acceptance step of accepting an input of thread information about threads used for the car seat fabric by the car seat fabric simulation device;

a 3-D fabric image creation step of creating a steric structure of the car seat fabric within a 3-D space as a 3-D fabric image by the car seat fabric simulation device on the basis of the texture information accepted at the texture information input acceptance step and the thread information accepted at the thread information acceptance step;

an image attachment step of attaching the 3-D fabric image created in the 3-D fabric image creation step to a car seat model by the car seat fabric simulation device; and a display step of displaying the car seat model to which the 3-D fabric image is attached by the image attachment step, by the car seat fabric simulation device, in the 3-D fabric image creation step, a woven structure is transformed into a steric form on the basis of the texture information, threads of warp and threads of weft forming the car seat fabric are wobbled, and a thickness of a second thread is changed on the basis of a force exerted from a first thread of one of the warp and the weft to the second thread of the other.

6. The car seat fabric manufacturing method according to claim 5, wherein in the 3-D fabric image creation step, in a case where threads of warp and threads of weft forming the car seat fabric cross each other, a shape of a thread is changed on the basis of a tensile force acting on each thread and a pressure acting inside a cross section of each thread, and in a case where an interval between center points of cross sections of a thread and an adjacent thread is smaller than a thickness of the thread, the shape of the thread is changed on the basis of a repulsive force corresponding to an elastic force of each thread.

7. A car seat fabric ordering system for trading a simulated 3-D woven structure of a car seat fabric and order information for the manufacturing of the car seat fabric being simulated between a textile manufacturer and an automobile manufacturer, comprising a processor for performing the following steps:

a simulation step of simulating a 3-D woven structure of a car seat fabric by a car seat fabric simulation device;

an order information transmission step of transmitting order information providing an instruction to manufacture the car seat fabric simulated in the simulation step from a client computer at the automobile manufacturer end;

an order information reception step of receiving the order information transmitted in the order information transmission step at a client computer at the textile manufacturer end; and a manufacturing step of manufacturing the car seat fabric by the car seat fabric manufacturing device using the 3-D woven structure of the car seat fabric simulated in the simulation step after the order information is received in the order information reception step, wherein the simulation step includes:

a texture information input acceptance step of accepting an input of texture information about a fabric texture used for the car seat fabric by the car seat fabric simulation device;

a thread information input acceptance step of accepting an input of thread information about threads used for the car seat fabric by the car seat fabric simulation device;

a 3-D fabric image creation step of creating a steric structure of the car seat fabric within a 3-D space as a 3-D fabric image by the car seat fabric simulation device on the basis of the texture information accepted at the texture information input acceptance step and the thread information accepted at the thread information acceptance step;

an image attachment step of attaching the 3-D fabric image created in the 3-D fabric image creation step to a car seat model by the car seat fabric simulation device; and a display step of displaying the car seat model to which the 3-D fabric image is attached by the image attachment step, by the car seat fabric simulation device, in the 3-D fabric image creation step, a woven structure is transformed into a steric form on the basis of the texture information, threads of warp and threads of weft forming the car seat fabric are wobbled, and a thickness of a second thread is changed on the basis of a force exerted from a first thread of one of the warp and the weft to the second thread of the other.

8. The car seat fabric ordering system according to claim 7, wherein in the 3-D fabric image creation step, in a case where threads of warp and threads of weft forming the car seat fabric cross each other, a shape of a thread is changed on the basis of a tensile force acting on each thread and a pressure acting inside a cross section of each thread, and in a case where an interval between center points of cross sections of a thread and an adjacent thread is smaller than a thickness of the thread, the shape of the thread is changed on the basis of a repulsive force corresponding to an elastic force of each thread.

* * * * *